United States Patent
Li et al.

(10) Patent No.: US 10,012,055 B2
(45) Date of Patent: Jul. 3, 2018

(54) ANALYSIS OF SURFACE NETWORKS FOR FLUIDS

(71) Applicant: Schlumberger Technology Corporation, Sugar Land, TX (US)

(72) Inventors: Jun Li, Houston, TX (US); Rodney Lessard, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 810 days.

(21) Appl. No.: 14/066,857

(22) Filed: Oct. 30, 2013

(65) Prior Publication Data
US 2014/0207430 A1 Jul. 24, 2014

Related U.S. Application Data

(60) Provisional application No. 61/756,346, filed on Jan. 24, 2013.

(51) Int. Cl.
G06F 3/0484 (2013.01)
E21B 41/00 (2006.01)
G06F 17/10 (2006.01)

(52) U.S. Cl.
CPC ............ *E21B 41/00* (2013.01); *G06F 3/0484* (2013.01); *G06F 17/10* (2013.01)

(58) Field of Classification Search
None
See application file for complete search history.

(56) References Cited

U.S. PATENT DOCUMENTS

| | | | | |
|---|---|---|---|---|
| 6,766,255 B2 * | 7/2004 | Stone | ...................... | G01V 11/00 702/13 |
| 6,928,399 B1 * | 8/2005 | Watts | ...................... | E21B 49/00 702/13 |
| 7,277,836 B2 * | 10/2007 | Netemeyer | ............ | G01V 11/00 703/10 |
| 7,761,270 B2 * | 7/2010 | Banki | ..................... | G01V 11/00 703/10 |
| 7,877,246 B2 * | 1/2011 | Moncorge | ............... | E21B 49/00 702/13 |
| 9,361,414 B2 * | 6/2016 | Mustapha | ........... | G06F 17/5018 |

(Continued)

FOREIGN PATENT DOCUMENTS

| | | |
|---|---|---|
| GB | 2455237 A | 6/2009 |
| WO | 0032905 A3 | 9/2000 |
| WO | 2012039811 A1 | 3/2012 |

OTHER PUBLICATIONS

Schlumberger, "Pipesim User Guide", 2005, 195 pages.
(Continued)

*Primary Examiner* — Kibrom K Gebresilassie
(74) *Attorney, Agent, or Firm* — Colin L. Wier

(57) ABSTRACT

A method can include building a network model that represents a production system for fluid, assigning equations to sub-networks in the network model where at least one of the sub-networks is assigned equations formulated for solving for enthalpy implicitly or temperature implicitly, providing data, transferring the data to the network model and simulating physical phenomena associated with the production system using the network model to provide simulation results. Various other technologies, techniques, etc., are also disclosed.

14 Claims, 8 Drawing Sheets

(56) References Cited

U.S. PATENT DOCUMENTS

| | | | | |
|---|---|---|---|---|
| 2010/0049490 A1* | 2/2010 | Watters | ............... | E21B 43/00 |
| | | | | 703/10 |
| 2012/0185220 A1* | 7/2012 | Shippen | ............. | G06F 17/5009 |
| | | | | 703/2 |
| 2012/0203515 A1* | 8/2012 | Pita | ...................... | E21B 49/00 |
| | | | | 703/2 |
| 2014/0303951 A1* | 10/2014 | Houeto | ............... | E21B 43/00 |
| | | | | 703/10 |

OTHER PUBLICATIONS

Shiralkar, et al., "An Efficient Formulation for Simultaneous Solution of the Surface Network Equations", SPE 93073 Reservoir Simulation Symposium, The Woodlands, Texas, Jan. 31-Feb. 2, 2005, 6 pages.

John R. Fanchi, PhD, Principles of Applied Reservoir Simulation, 3rd Edition, ISBN: 9780750679336, Gulf Professional Publishing, an imprint of Elsevier, (2006) at p. xix and pp. 162-166 of Chapter 10, entitled "Fundamentals of Reservoir Simulation" (8 pages).

* cited by examiner

US 10,012,055 B2

ANALYSIS OF SURFACE NETWORKS FOR FLUIDS

RELATED APPLICATION

This application claims the benefit of U.S. Provisional Patent Application having Ser. No. 61/756,346 filed 24 Jan. 2013, which is incorporated by reference herein.

BACKGROUND

Production systems can provide for transportation of oil and gas fluids from well locations to processing facilities and represent a substantial investment in infrastructure with both economic and environmental impact. Simulation of such systems, which may include hundreds or thousands of flowlines and production equipment interconnected at junctions to form a network, can be a considerable task (e.g., involving detailed multiphase flow science as well as implementation of engineering and mathematical techniques to address large systems of equations). Various examples of techniques and technologies described herein may be implemented, for example, to formulate, solve, etc., equations that represent a production system.

SUMMARY

A method can include building a network model that represents a production system for fluid, assigning equations to sub-networks in the network model where at least one of the sub-networks is assigned equations formulated for solving for enthalpy implicitly or temperature implicitly, providing data, transferring the data to the network model and simulating physical phenomena associated with the production system using the network model to provide simulation results. A system can include a processor, a memory device having memory accessible by the processor and modules that include processor-executable instructions stored in the memory of the memory device, the instructions executable to instruct the system to build a network model that represents a production system for fluid, assign equations to sub-networks in the network model where at least one of the sub-networks is assigned equations formulated for solving for enthalpy implicitly or temperature implicitly, provide data, transfer the data to the network model and simulate physical phenomena associated with the production system using the network model to provide simulation results. One or more computer-readable media can include computer-executable instructions executable by a computer to instruct the computer to receive simulation results for physical phenomena associated with a production system modeled by a network model, analyze the simulation results and identify one or more sub-networks in the network model for assignment of equations formulated for solving for enthalpy implicitly or temperature implicitly. Various other technologies, techniques, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
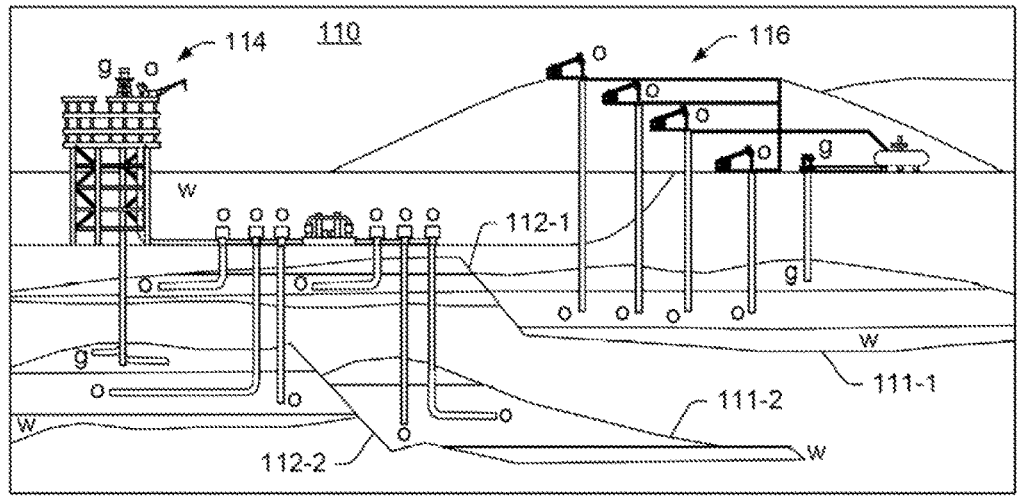
FIG. 1 illustrates an example field system that includes various components, an example of a method and an example of a device or system.
Figure 1:
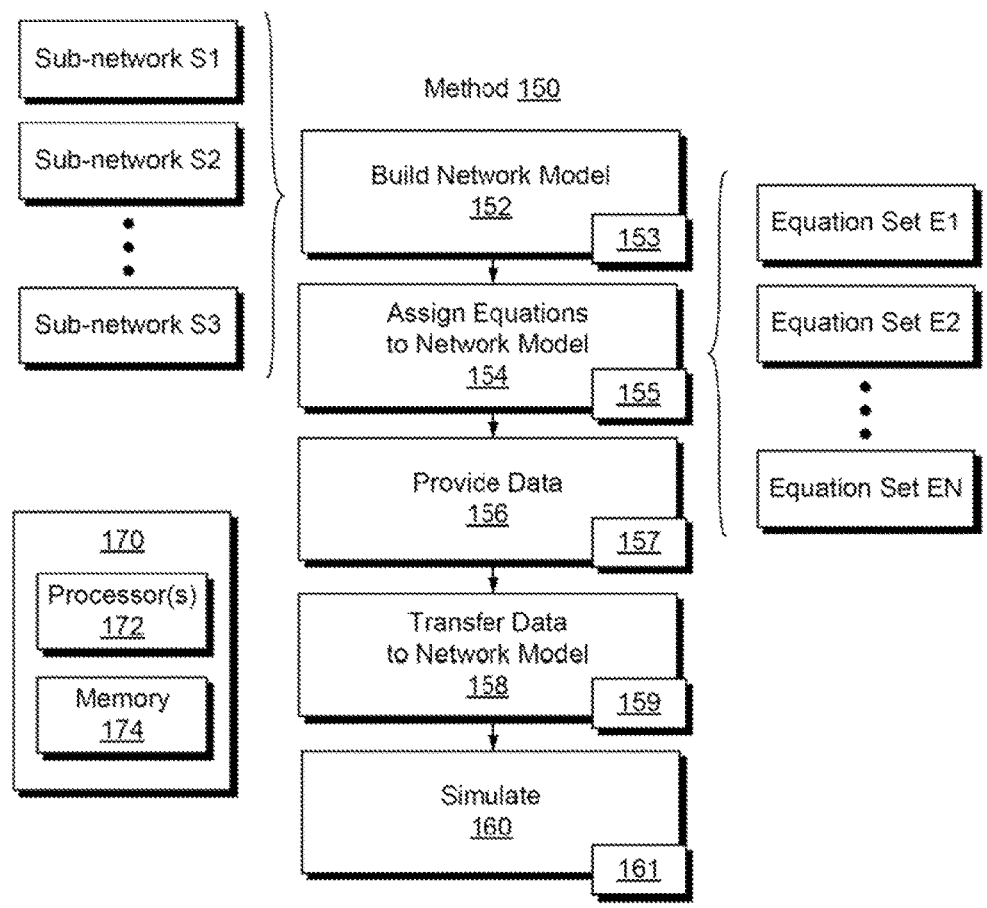

FIG. 1 shows an example of a geologic environment 110 that includes reservoirs 111-1 and 111-2, which may be faulted by faults 112-1 and 112-2, an example of a method 150 and an example of a device or system 170. FIG. 1 also shows some examples of offshore equipment 114 for oil and gas operations related to the reservoirs 111-1 and 111-2 and onshore equipment 116 for oil and gas operations related to the reservoir 111-1.

As an example, a model may be made that models a geologic environment in combination with equipment, wells, etc. For example, a model may be a flow simulation model for use by a simulator to simulate flow in an oil, gas or oil and gas production system. Such a flow simulation model may include equations, for example, to model multiphase flow from a reservoir to a wellhead, from a wellhead to a reservoir, etc. A flow simulation model may also include equations that account for flowline and surface facility performance, for example, to perform a comprehensive production system analysis.

As an example, a flow simulation model may be a network model that includes various sub-networks specified using nodes, segments, branches, etc. As an example, a flow simulation model may be specified in a manner that provides for modeling of branched segments, multilateral segments, complex completions, intelligent downhole controls, etc.

As an example, a system may provide for transportation of oil and gas fluids from well locations to processing facilities and may represent a substantial investment in infrastructure with both economic and environmental impact. Simulation of such a system, which may include hundreds or thousands of flow lines and production equipment interconnected at junctions to form a network, can involve multiphase flow science and, for example, use of engineering and mathematical techniques for large systems of equations.

As an example, a flow simulation model may include equations for performing nodal analysis, pressure-volume-temperature (PVT) analysis, gas lift analysis, erosion analysis, corrosion analysis, production analysis, injection analysis, etc. in such an example, one or more analyses may be based, in part, on a simulation of flow in a modeled network.

As to nodal analysis, it may provide for evaluation of well performance, for making decisions as to completions, etc. A nodal analysis may provide for an understanding of behavior of a system and optionally sensitivity of a system (e.g., with respect to one or more variables and production, injection, production and injection, etc.). For example, a system variable may be selected for investigation and a sensitivity analysis performed. Such an analysis may include plotting inflow and outflow of fluid at a nodal point or nodal points in the system, which may indicate where certain opportunities may exist (e.g., for injection, for production, placement of equipment, etc.).

As an example, a modeling framework may include modules to facilitate generation of a flow simulation model. For example, a module may provide for modeling completions for vertical wells, completions for horizontal wells, completions for fractured wells, etc. A modeling framework may include modules for particular types of equations, for example, black-oil equations, equation-of-state (EOS) equations, etc. A modeling framework may include modules for artificial lift, for example, to model fluid injection, fluid pumping, etc. As an example, consider a module that includes features for modeling one or more electric submersible pumps (ESPs) (e.g., based in part on pump performance curves, motors, cables, etc.). As an example, a module may include features for modeling one or more pieces of steam-assisted gravity drainage (SAGD) equipment, processes associated with SAGD, etc.

As an example, an analysis using a flow simulation model may be a network analysis to identify production bottlenecks and constraints; assess benefits of new wells, additional pipelines, compression systems, etc.; calculate deliverability from field gathering systems; predict pressure and temperature profiles through flow paths; and/or plan full-field development.

As an example, a flow simulation model may provide for analyses with respect to future times, for example, to allow for optimization of production equipment, injection equipment, etc. As an example, consider an optimal time-based and conditional-event logic representation for daily field development operations that can be used to evaluate drilling of new developmental wells, installing additional processing facilities over time, choke-adjusted wells to meet production and operating limits, shutting in of depleting wells as reservoir conditions decline, etc. As an example, a module may provide for modeling a choke, for example, where the choke may be fixed, adjustable, etc. In such an example, a model may include, as variables, choke settings, choke characteristics, etc.

As an example, a flow simulation model may include one or more sets of equations for three-phase mechanistic multiphase flow (e.g., according to one or more of a LedaFlow™ point model (Kongsberg Oil & Gas Technologies AS, Sandvika, Norway), OLGA-S™ model (Schlumberger Ltd, Houston, Tex.), TUFFP unified mechanistic models (Tulsa University Fluid Flow Projects, Tulsa, Okla.), etc.).

As to the method 150 of FIG. 1, it can include a build block 152 for building a network model that represents a production system for fluid (e.g., gas, liquid, multiphase fluid, etc.); an assignment block 154 for assigning equations to sub-networks in the network model (e.g., where at least one of the sub-networks is optionally assigned equations formulated for solving for enthalpy implicitly or temperature implicitly), a provision block 156 for providing data; a transfer block 158 for transferring the data to the network model; and a simulation block 160 for simulating physical phenomena associated with the production system using the network model to provide simulation results.

The method 150 is shown in FIG. 1 in association with various computer-readable media (CRM) blocks 153, 155, 157, 159 and 161. Such blocks can include instructions suitable for execution by one or more processors (or processing cores) 172 to instruct the computing device or system 170 to perform one or more actions. While various blocks are shown, a single medium may be configured with instructions to allow for, at least in part, performance of various actions of the method 150. As an example, a computer-readable medium (CRM) may be a computer-readable storage medium, for example, such as a memory device 174 of the computing device or system 170, where the memory device 174 includes memory.

A production system can include equipment, for example, where a piece of equipment of the production system may be represented in a sub-network of a network model and, for example, assigned equations formulated to represent the piece of equipment as non-adiabatic (e.g., or adiabatic). As an example, a piece of equipment may include an electric motor operatively coupled to a mechanism to move fluid (e.g., a pump, compressor, etc.). As an example, a piece of equipment may include a heater coupled to a power source, a fuel source, etc. (e.g., consider a steam generator). As an example, a piece of equipment may include a conduit for delivery of fluid where the fluid may be for delivery of heat energy (e.g., consider a steam injector). As an example, a piece of equipment may include a conduit for delivery of a substance (e.g., a chemical, a proppant, etc.).

As an example, a sub-network may be assigned equations formulated for solving for enthalpy implicitly or temperature implicitly to represent fluid at or near a critical point, to represent heavy oil, to represent steam, to represent water or one or more other fluids (e.g., optionally subject to certain physical phenomena such as pressure, temperature, etc.).

As an example, a method can include analyzing simulation results and, based at least in part on the analyzing, assigning sub-network equations formulated for solving for enthalpy implicitly or temperature implicitly. As an example, based at least in part on such analyzing, a method may include reassigning a sub-network previously assigned equations formulated for solving for enthalpy implicitly or temperature implicitly with equations formulated for solving for enthalpy explicitly and temperature explicitly.

As an example, a system can include a processor, a memory device that includes memory accessible by the processor, and one or more modules that include processor-executable instructions stored in the memory of the memory device where, for example, the instructions may be executable to instruct the system to build a network model that represents a production system for fluid, assign equations to sub-networks in the network model where at least one of the sub-networks is assigned equations formulated for solving for enthalpy implicitly or temperature implicitly, provide data, transfer the data to the network model and simulate physical phenomena associated with the production system using the network model to provide simulation results.

As an example, a system may include an adaptive implicit module that includes processor-executable instructions stored in the memory of the memory device where, for example, the instructions may be executable to instruct the system to adapt one or more sub-networks by assigning equations to the one or more of the sub-networks. As an example, such a module may adapt the sub-network based at least in part on simulation results (e.g., that may have involved a network model that included that sub-network).

As an example, a system can include one or more sub-networks assigned equations formulated for solving for enthalpy implicitly or temperature implicitly to represent fluid at or near a critical point, to represent heavy oil, to represent steam or one or more other fluids (e.g., optionally subject to certain physical phenomena such as pressure, temperature, etc.).

As an example, a system can include a sub-network assigned equations formulated for solving for enthalpy implicitly or temperature implicitly to represent steam associated with equipment for an enhanced oil recovery (EOR) process (e.g., steam-assisted gravity drainage (SAGD) and/or other EOR process).

As an example, a system can include a sub-network that represents a piece of equipment of a production system by assigning that sub-network equations formulated to represent the piece of equipment as non-adiabatic. In such an example, the piece of equipment may include an electric motor operatively coupled to a mechanism to move fluid (e.g., a compressor, a pump, etc.).

As an example, one or more computer-readable media can include computer-executable instructions executable by a computer to instruct the computer to: receive simulation results for physical phenomena associated with a production system modeled by a network model; analyze the simulation results; and identify one or more sub-networks in the network model for assignment of equations formulated for solving for enthalpy implicitly or temperature implicitly. In such an example, computer-executable instructions may be provided, executable by a computer, to instruct the computer to: assign the equations formulated for solving for enthalpy implicitly or temperature implicitly to the one or more identified sub-networks.

Figure 2:
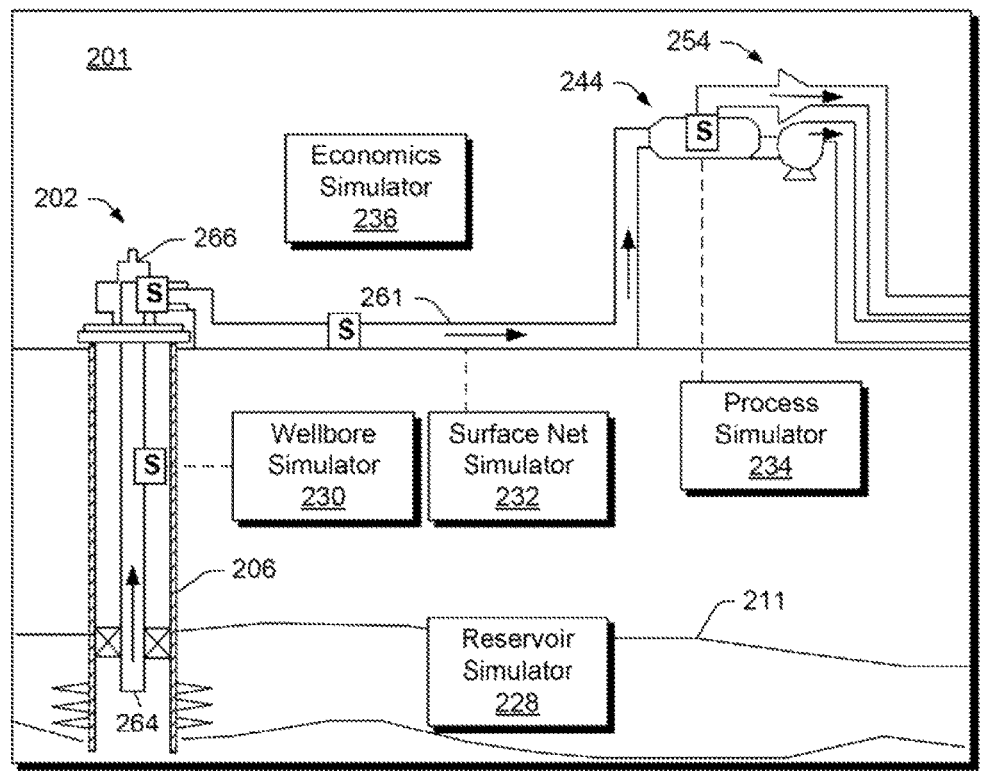
FIG. 2 illustrates an example of a system.
Figure 2:
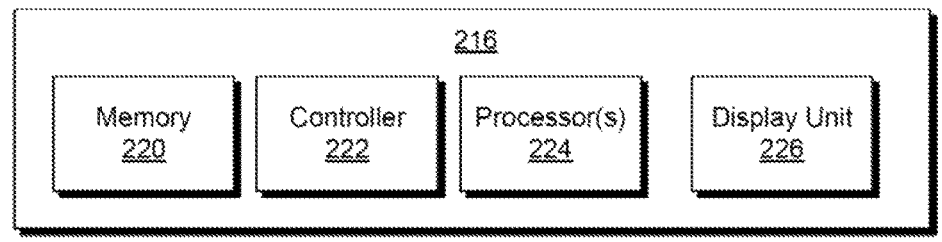

FIG. 2 shows an example of a schematic view of a portion of a geologic environment 201 that includes equipment. As shown in FIG. 2, the environment 201 includes a wellsite 202 and a network 244. The wellsite 202 includes a wellbore 206 extending into earth as completed and prepared for production of fluid from a reservoir 211.

In the example of FIG. 2, wellbore production equipment 264 extends from a wellhead 266 of the wellsite 202 and to the reservoir 211 to draw fluid to the surface. As shown, the wellsite 202 is operatively connected to the network 244 via a transport line 261. As indicated by various arrows, fluid can flow from the reservoir 211, through the wellbore 206 and onto the network 244. Fluid can then flow from the network 244, for example, to one or more fluid processing facilities.

In the example of FIG. 2, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit 216 (e.g., to instruct the sensors to acquire data, to collect data from the sensors, etc.).

In the example of FIG. 2, the surface unit 216 can include computer facilities, such as a memory device 220, a controller 222, one or more processors 224, and display unit 226 (e.g., for managing data, visualizing results of an analysis, etc.). As an example, data may be collected in the memory device 220 and processed by the processor(s) 224 (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

In the example of FIG. 2, a transceiver (not shown) may be provided to allow communications between the surface unit 216 and one or more pieces of equipment in the environment 201. For example, the controller 222 may be used to actuate mechanisms in the environment 201 via the transceiver, optionally based on one or more decisions of a decision making process. In such a manner, equipment in the environment 201 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit 216 or other unit, system, etc.). As an example, data fed into one or more simulators may be historical data, real time data or combinations thereof. As an example, simulation through one or more simulators may be repeated or adjusted based on the data received.

In the example of FIG. 2, simulators can include a reservoir simulator 228, a wellbore simulator 230, and a surface network simulator 232, a process simulator 234 and an economics simulator 236. As an example, the reservoir simulator 228 may be configured to solve for hydrocarbon flow rate through a reservoir and into one or more wellbores. As an example, the wellbore simulator 230 and surface network simulator 232 may be configured to solve for hydrocarbon flow rate through a wellbore and a surface gathering network of pipelines. As to the process simulator 234, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 236 may be configured to model costs associated with at least part of an operation.

Figure 3:
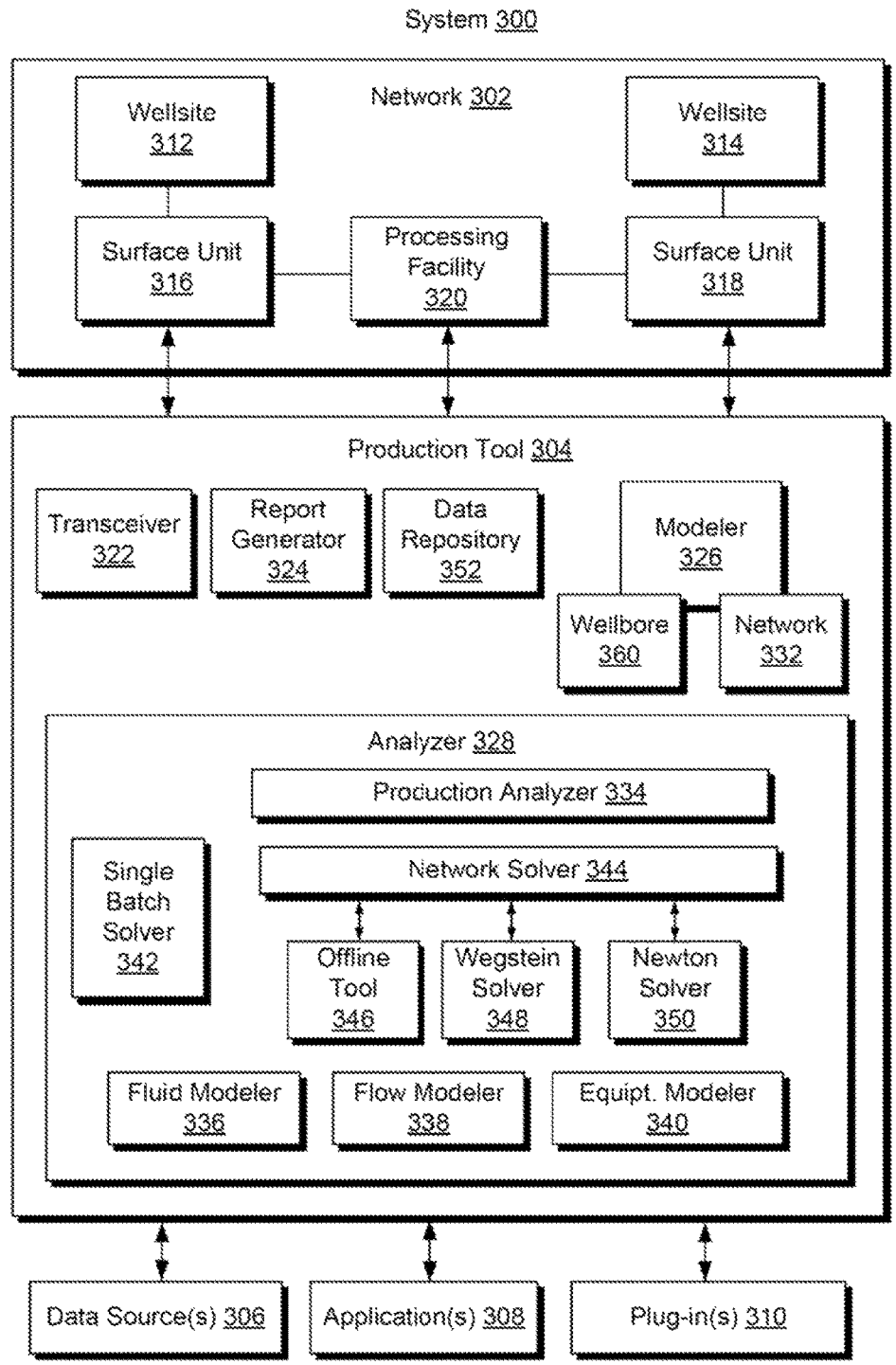
FIG. 3 illustrates an example of a system.

FIG. 3 shows an example of a schematic diagram of a production system 300 for performing oilfield production operations. As shown in the example of FIG. 3, the production system 300 can include an oilfield network 302, an oilfield production tool 304, one or more data sources 306, one or more oilfield application(s) 308, and one or more plug-in(s) 310. As an example, the oilfield network 302 can be an interconnection of pipes (e.g., conduits) that connects wellsites (e.g., a wellsite 1 312, a wellsite n 314, etc.) to a processing facility 320. A pipe in the oilfield network 302 may be connected to a processing facility (e.g., a processing facility 320), a wellsite (e.g., the wellsite 1 312, the wellsite n 314, etc.), and/or a junction in which pipes are connected. As an example, flow rate of fluid and/or gas into pipes may be adjustable; thus, certain pipes in the oilfield network 302 may be choked or closed so as to not allow fluid and/or gas through the pipe. A pipe may be considered open (e.g., optionally choked) when the pipe allows for flow of fluid and/or gas. As to a choke, choking may allow for adjusting one or more characteristics of a piece of flow equipment (e.g., a cross-sectional flow area, etc.), for example, for adjusting to fully open flow, for adjusting to choked flow and/or for adjusting to no flow (e.g., closed).

As an example, a choke may include an orifice that is used to control fluid flow rate or downstream system pressure. As an example, a choke may be provided in any of a variety of configurations (e.g., for fixed and/or adjustable modes of operation). As an example, an adjustable choke may enable fluid flow and pressure parameters to be changed to suit process or production requirements. As an example, a fixed choke may be configured for resistance to erosion under prolonged operation or production of abrasive fluids.

The oilfield network 302 may be a gathering network and/or an injection network. A gathering network may be an oilfield network used to obtain hydrocarbons from a wellsite (e.g., the wellsite 1 312, the wellsite n 314, etc.). In a gathering network, hydrocarbons may flow from the wellsites to the processing facility 320. An injection network may be an oilfield network used to inject the wellsites with injection substances, such as water, carbon dioxide, and other chemicals that may be injected into the wellsites. In an injection network, the flow of the injection substance may flow towards the wellsite (e.g., toward the wellsite 1 312, the wellsite n 314, etc.).

The oilfield network 302 may also include one or more surface units (e.g., a surface unit 1 316, a surface unit n 318, etc.), for example, a surface unit for each wellsite. Such surface units may include functionality to collect data from sensors (see, e.g., the surface unit 216 of FIG. 2). Such sensors may include sensors for measuring flow rate, water cut, gas lift rate, pressure, and/or other such variables related to measuring and monitoring hydrocarbon production.

As an example, the oilfield production tool 304 may be connected to the oilfield network 302. The oilfield production tool 304 may be a simulator (e.g., a simulation framework) or a plug-in for a simulator (e.g., or other application(s)). The oilfield production tool 304 may include an oilfield transceiver 322, a report generator 324, an oilfield modeler 326, and an oilfield analyzer 328.

As an example, the oilfield transceiver 322 can include functionality to collect oilfield data. The oilfield data may be data from sensors, historical data, or any other such data. The oilfield transceiver 322 may also include functionality to interact with a user and display data such as a production result.

As an example, the report generator 324 can include functionality to produce graphical and textual reports. Such reports may show historical oilfield data, production models, production results, sensor data, aggregated oilfield data, or any other such type of data.

As an example, the data repository 352 may be a storage unit and/or device (e.g., a file system, database, collection of tables, or any other storage mechanism) for storing data, such as the production results, sensor data, aggregated oilfield data, or any other such type of data. As an example, the data repository 352 may include multiple different storage units and/or hardware devices. Such multiple different storage units and/or devices may or may not be of the same type or located at the same physical site. As an example, the data repository 352, or a portion thereof, may be secured via one or more security protocols, whether physical, algorithmic or a combination thereof (e.g., data encryption, secure device access, secure communication, etc.).

In the example of FIG. 3, the oilfield modeler 326 can include functionality to create a model of a wellbore and an oilfield network. As shown, the oilfield modeler 326 includes a wellbore modeler 330 and a network modeler 332. As an example, the wellbore modeler 330 can allow a user to create a graphical wellbore model or single branch model (e.g., interactively via a graphical user interface (GUI), via file reading, etc.). As an example, a wellbore model can define operating parameters (e.g., actual, theoretical, etc.) of a wellbore (e.g., pressure, flow rate, etc.). As an example, a single branch model may define operating parameters of a single branch in an oilfield network.

As to the network modeler 332, it may allow a user to create a graphical network model that combines wellbore models and/or single branch models. As an example, the network modeler 328 and/or wellbore modeler 330 may model pipes in the oilfield network 302 as branches of the oilfield network 302 (e.g., optionally as one or more segments, optionally with one or more nodes, etc.). In such an example, each branch may be connected to a wellsite or a junction. A junction may be defined as a group of two or more pipes that intersect at a particular location (e.g., a junction may be a node or a type of node).

As an example, a modeled oilfield network may be formed as a combination of sub-networks. In such an example, a sub-network may be defined as a portion of an oilfield network. For example, a sub-network may be connected to the oilfield network 302 using at least one branch. Sub-networks may be a group of connected wellsites, branches, and junctions. As an example, sub-networks may be disjoint (e.g., branches and wellsites in one sub-network may not exist in another sub-network).

As an example, the oilfield analyzer 328 can include functionality to analyze the oilfield network 302 and generate a production result for the oilfield network 302. As shown in the example of FIG. 3, the oilfield analyzer 328 may include one or more of the following: a production analyzer 334, a fluid modeler 336, a flow modeler 338, an equipment modeler 340, a single branch solver 342, a network solver 344, a Wegstein solver 346, a Newton solver 350, and an offline tool 346.

As an example, the production analyzer 334 can include functionality to receive a workflow request and interact with the single branch solver 342 and/or the network solver 344 based on particular aspects of the workflow. For example, the workflow may include a nodal analysis to analyze a wellsite or junction of branches, pressure and temperature profile, model calibration, gas lift design, gas lift optimization, network analysis, and other such workflows.

As an example, the fluid modeler 336 can include functionality to calculate fluid properties (e.g., phases present, densities, viscosities, etc.) using one or more compositional and/or black-oil fluid models. The fluid modeler 336 may include functionality to model oil, gas, water, hydrate, wax, and asphaltene phases. As an example, the flow modeler 338 can include functionality to calculate pressure drop in pipes (e.g., pipes, tubing, etc.) using industry standard multiphase flow correlations. As an example, the equipment modeler 340 can include functionality to calculate pressure changes in equipment pieces (e.g., chokes, pumps, compressors, etc.). As an example, one or more substances may be introduced via a network for purposes of managing asphaltenes, waxes, etc. As an example, a modeler may include functionality to model interaction between one or more substances and fluid (e.g., including material present in the fluid).

As an example, the single branch solver 342 may include functionality to calculate the flow and pressure drop in a wellbore or a single flowline branch given various inputs.

As an example, the network solver 344 can includes functionality calculate a flow rate and pressure drop throughout the oilfield network 302. The network solver 344 may be configured to connect to the offline tool 346, the Wegstein solver 348, and the Newton solver 350.

As an example, the offline tool 346 may include a wells offline tool and a branches offline tool. A wells offline tool may include functionality to generate a production model using the single branch solver 342 for a wellsite or branch. A branches offline tool may include functionality to generate a production model for a sub-network using the production model for a wellsite, a single branch, or a sub-network of the sub-network.

As an example, a production model may be capable of providing a description of a wellsite with respect to various operational conditions. A production model may include one or more production functions that may be combined, for example, where each production function may be a function of variables related to the production of hydrocarbons. For example, a production function may be a function of flow rate and/or pressure. Further, a production function may account for environmental conditions related to a sub-network of the oilfield network 302, such as changes in elevation (e.g., for gravity head, pressure, etc.), diameters of pipes, combination of pipes, and changes in pressure resulting from joining pipes. A production model may provide estimates of flow rate for a wellsite or sub-network of an oilfield network.

As an example, one or more separate production functions may exist that can account for changes in one or more values of an operational condition. An operational condition may identify a property of hydrocarbons or injection substance. For example, an operational condition may include a water-cut (WC), reservoir pressure, gas lift rate, etc. Other operational conditions, variables, environmental conditions may be considered.

As to the network solver 344, in the example of FIG. 3, it is shown as being connected to the Wegstein solver 348 and/or the Newton solver 350. The Wegstein solver 348 and the Newton solver 350 include functionality to combine a production model for several sub-networks to create a production result that may be used to plan an oilfield network, optimize flow rates of wellsites in an oilfield network, and/or identify and address faulty components within an oilfield network. The Wegstein solver 348 can use an iterative method with Wegstein acceleration.

An oilfield network may be solved by identifying pressure drop (e.g., pressure differential), for example, through use of momentum equations. As an example, an equation for pressure differential may account for factors such as fluid potential energy (e.g., hydrostatic pressure), friction (e.g., shear stress between conduit wall and fluid), and acceleration (e.g., change in fluid velocity). As an example, an equation may be expressed in terms of static reservoir pressure, a flowing bottom hole pressure and flowrate. As an example, equations may account for vertical, horizontal or angled arrangements of equipment. Various examples of equations may be found in a multiphase flow simulator such as the simulator of the PIPESIM™ simulation framework (Schlumberger Limited, Houston, Tex.), which may be implemented for design and diagnostic analysis of oil and gas production systems. A manual for the PIPESIM™ simulation framework (e.g., consider the PIPESIM Suite User Guide, 2005, incorporated by reference herein) includes information, for example, for building a model; fluid and multiphase flow modeling; reservoir, well and completion modeling; field equipment modeling; and operations (e.g., artificial lift, gas lift, wax prediction, nodal analysis, network analysis, field planning, multi-well analysis, etc.).

As an example, an equation for pressure differential (e.g., ΔP) may be rearranged to solve for flow rate (e.g., Q), where the equation may include the Reynolds number (e.g., Re, a dimensionless ratio of inertial to viscous forces), one or more friction factors (e.g., which may depend on flow regime), etc.

Through use of equations for flow into and out of a branch and equating to zero, a linear matrix in unknown pressures may be obtained. As an example, fixed flow branches (i.e., branches in which the flow does not change) may be solved directly for the node pressures.

Thus, as an example, the Wegstein Solver 348 may perform a process as follows: (1) obtain initial estimates for the frictional and elevational resistances from the production models; (2) solve the linear system for the unknown node pressures; (3) calculate resulting flow rates; (4) calculate pressure residuals at each internal node; and (5) determine whether the maximum of the pressure residuals is lower than a predetermined tolerance. If the maximum pressure residual is not lower than a predetermined tolerance then the Wegstein solver may continue by rerun of the branches, with the pressure and flows calculated in items (2) and (3) above to re-estimate the branch resistances. Further, Wegstein acceleration may be applied to the resistances before returning to item (2).

The Newton solver 344 implements a Newton-Raphson technique for solving a system of non-linear equations. The Newton-Raphson technique can be applied iteratively for solving a system of non-linear equations defined by a vector of unknown variables and associated residual equations. Following an initial guess, iterations commence, for example, until one or more criteria are met (e.g., number of iterations, error, etc.). Updates for each iteration of the Newton-Raphson technique may be generated by solving a matrix equation that includes a Jacobian matrix formed by differentiating residual equations with respect to the variables. As an example, an adjustable factor may be used to adjust from a pure Newton-Raphson type of update to another type of update.

The Newton solver 344 includes functionality to solve the oilfield network 302 by implementing the Newton method (discussed above). Below is an example of how the Newton solver may be used to solve oilfield network 302.

For solving an oilfield network, a process may include: (1) defining variables and residual equations; (2) determine initial solution; (3) calculating residual and Jacobian matrix for each iteration; (4) solve Jacobian equation for the Newton update; (5) optionally determining adjustment factor; and (6) updating the solution.

With regards to item (1), defining variables and residual equations, branches in an oilfield network may include a number of equipment items. Each branch may be divided into sub-branches with each sub-branch containing a single equipment item. As an example, a new node may be used to join each pair of sub-branches, In this example, primary Newton-Raphson variables can include a flow ($Q_{ib}$) in each sub-branch in the network and a pressure $P_{in}$ at each node in the network. In this example, temperature (or enthalpy) and composition may be treated as secondary variables.

As an example, residual equations may include a branch residual, an internal node residual, and a boundary condition. In such an example, a branch residual for a sub-branch relates the branch flow to the pressure at the branch inlet node and the pressure at the outlet node. As an example, internal node residuals can define where total flow into a node is equal to total flow out of the node.

As an example, determining an initial solution may be performed using a production model where for each subsequent iteration, a Jacobian matrix is calculated. The values of the Jacobian matrix may be used to solve a Jacobian equation for the Newton-Raphson update. To solve the Jacobian equation, one or more types of matrix solvers may be used.

In the example of FIG. 3, the one or more data sources 306 include one or more types of repositories for data. For example, the one or more data sources 306 may be Internet sources, sources from a company having ties to the oilfield network 302, or any other location in which data may be obtained. The data may include historical data, data collected from other oilfield networks, data collected from the oilfield network being modeled, data describing environmental or operational conditions.

In the example of FIG. 3, the one or more oilfield applications 308 may be applications related to the production of hydrocarbons. The one or more oilfield applications 308 may include functionality to evaluate a formation, manage drilling operations, evaluate seismic data, evaluate workflows in the oilfield, perform simulations, or perform any other oilfield related function. In the example of FIG. 3, the one or more plug-ins 310 may allow integration with packages such as, for example, a TUFPP model, an OLGA™ model, an Infochem Multiflash model (Infochem Computer Services Ltd., London, UK), an equipment model, etc.

While the example of FIG. 3 shows the oilfield production tool 304 as a separate component from the oilfield network 302, the oilfield production tool 304 may alternatively be part of the oilfield network 302. For example, the oilfield production tool 304 may be located at one of the wellsites (e.g., the wellsite 1 312, the wellsite n 314, etc.), at the processing facility 320, or any other location in the oilfield network 302. As another example, the oilfield production tool 304 may exist separate from the oilfield network 302, such as when the oilfield production tool 304 is used to plan the oilfield network.

Figure 4:
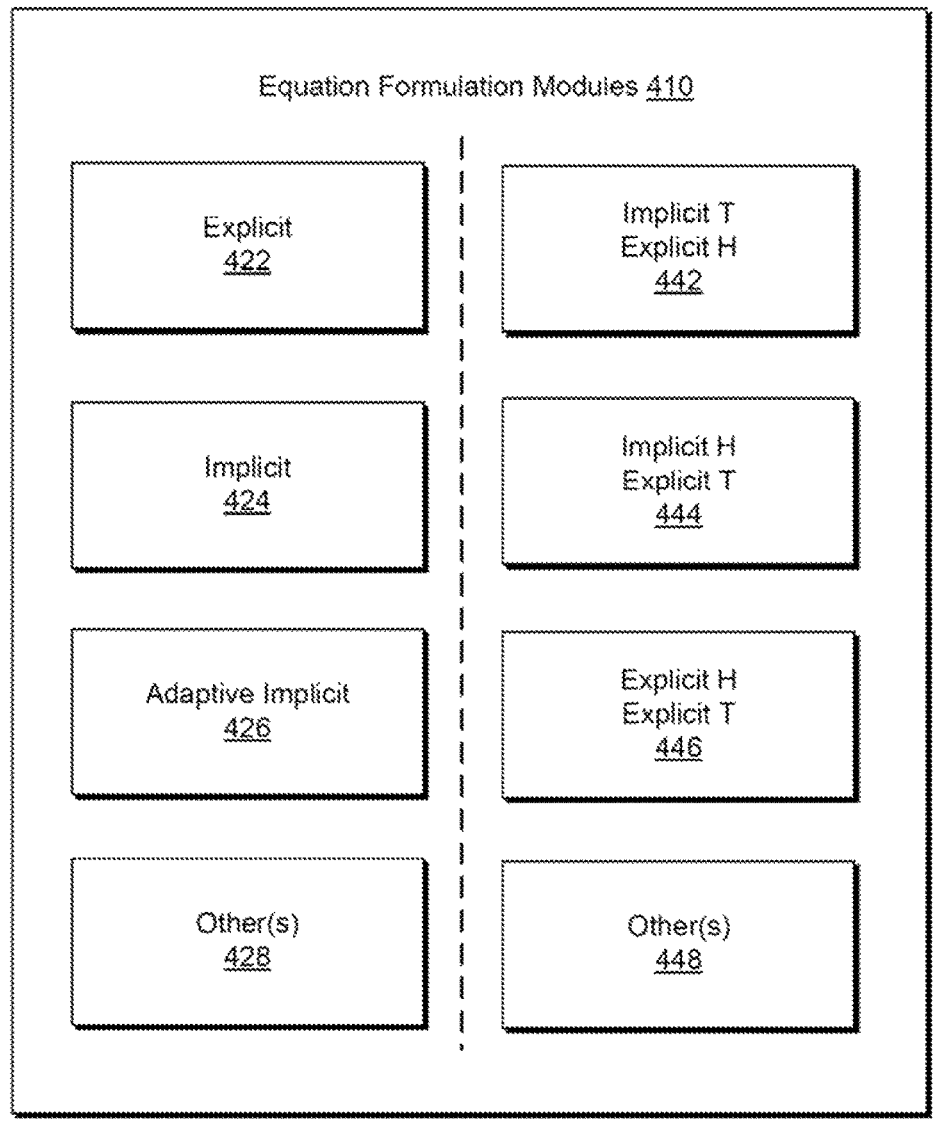
FIG. 4 illustrates examples of modules.

FIG. 4 shows various examples of equation formulation modules 410, including an explicit module 422, an implicit module 424, an adaptive implicit module 426 and one or more other modules 428. Also shown in FIG. 4 are more specific modules, including an implicit temperature (T) and explicit enthalpy (H) module 442, an implicit enthalpy (H) and explicit temperature (T) module 444, explicit enthalpy (H) and explicit temperature (T) module 446, and one or more other modules 448. In the example of FIG. 4, one or more of the more specific modules may be included in or implemented via one or more of the modules 422, 424, 426, and 428. For example, the implicit T and explicit H module 442 may provide instructions for use of the implicit module 424 and the explicit module 422 (e.g., optionally in an adaptive manner).

Various types of numerical solution schemes may be characterized as being explicit or implicit. For example, when a direct computation of dependent variables can be made in terms of known quantities, a scheme may be characterized as explicit. Whereas, when dependent variables are defined by coupled sets of equations, and either a matrix or iterative technique is implemented to obtain a solution, a scheme may be characterized as implicit.

As another example, a scheme may be characterized as adaptive implicit ("AIM"). An AIM scheme may adapt, for example, based on one or more gradients as to one or more variables, properties, etc. of a model. For example, where a model of a subterranean environment includes a region where porosity varies rapidly with respect to one or more physical dimensions (e.g., x, y, or z), a solution for one or more variables in that region may be modeled using an implicit scheme while an overall solution for the model also includes an explicit scheme (e.g., for one or more other regions for the same one or more variables).

As an example of an AIM scheme, consider an AIM scheme available as part of the ECLIPSE™ 300 reservoir simulator marketed by Schlumberger Ltd. (Houston, Tex.).

The ECLIPSE™ 300 reservoir simulator may implement a fully implicit scheme or an implicit-explicit scheme that is implicit in pressure and explicit in saturation, known as IMPES. In the fully implicit scheme, values for both pressure and saturation are provided at the end of each simulation time-step; whereas, the IMPES scheme uses saturation values from the beginning of the time-step to solve for pressure values at the end of the time-step. In such examples, a reservoir simulator iterates until pressures values in grid blocks of a model of the reservoir being simulated have reached some internally consistent solution. However, a solution may be challenging to find if saturation (which the IMPES scheme assumes is constant within a time-step) changes rapidly during that time-step (e.g., a large percentage change in grid block values for saturation). The IMPES scheme may be able to cope with such a challenge by decreasing "length" (e.g., duration) of the time-step but at the cost of more time-steps (e.g., in an effort to achieve a more stable solution).

The aforementioned fully implicit scheme may be a more stable option with saturation and pressure being obtained simultaneously so as any difference between their values for one time-step and a next time-step does not disturb a solution process as much as when compared to the IMPES scheme. Thus, in a fully implicit scheme, the "length" (e.g., duration) of a time-step may be larger but it also means that the fully implicit scheme may take additional processing time to achieve solutions (e.g., in comparison with an IMPES scheme). However, in a reservoir where properties change rapidly, a fully implicit scheme may provide a solution in less computational time than an IMPES scheme, even though an iteration of the fully implicit scheme may take longer to complete when compared to an iteration of the IMPES scheme.

The aforementioned AIM scheme of the ECLIPSE™ 300 reservoir simulator can provide for some flexibility when seeking to solve a reservoir model for pressure and saturation values. For example, when the reservoir simulator uncovers parts of a reservoir model where properties change rapidly and the IMPES scheme may be unable to provide a reasonable result, the reservoir simulator may adopt an implicit approach in the relevant areas. As an example, for the AIM scheme of the ECLIPSE™ 300 reservoir simulator, a user may specify a maximum proportion of a reservoir model to be solved implicitly as, if more than 20% of the reservoir model is being solved implicitly, it may be more effective to solve the entire reservoir model with an implicit scheme rather than the AIM scheme (e.g., where it implements a mixed or hybrid approach).

The aforementioned ECLIPSE™ 300 reservoir simulator may also implement one or more modules such as a black-oil simulator module, a compositional simulator module, or a thermal simulator module. As an example, a black-oil simulator module may include equations to model three fluid phases (e.g., oil, water, and gas, with gas dissolving in oil and oil vaporizing in gas); as an example, a compositional simulator module may include equations to model phase behavior and compositional changes; and, as an example, a thermal simulator module may include equations to model a thermal recovery processes such as steam-assisted gravity drainage (SAGO), cyclic stream operations, in-situ combustion, heater, and cold heavy oil production with sand.

As to network models, as an example, a method can include simulation of steady state operation of an oil and gas production system over various ranges of operating conditions and configurations. In such an example, the method may include an implicit evaluation of conservation of energy equations in addition to mass and momentum as an effective technique for efficiently and robustly simulating the production system where, for example, the production system includes fluid such as heavy oil, steam or other fluids at or near critical pressures or temperatures. The term "critical point" is sometimes used herein to specifically denote a vapor-liquid critical point of a material, above which distinct liquid and gas phases do not exist.

As mentioned, a production system can provide for transportation of oil and gas fluids from well locations along flowlines which are interconnected at junctions to combine fluids from many wells for delivery to a processing facility. Along these flowlines (including at one or more ends of a flowline), production equipment may be inserted to modify the flowing characteristics like flow rate, pressure, composition and temperature. As an example, a boundary condition may depend on a type of equipment, operation of a piece of equipment, etc.

As an example, a simulation may be performed using one type of equipment along a flowline and another simulation may be performed using another type of equipment along the same flowline, for example, to determine which type of equipment may be selected for installation in a production system. In such an example, one type of equipment may be simulated in a portion of a network using an implicit T and explicit H formulation while the other type of equipment may be simulated in a portion of the network using an implicit H and explicit T formulation; noting that other formulations may be used (see, e.g., FIG. 4). In such a manner, a simulation process may allow for selection of a formulation (e.g., manual or automatic) that suits a particular type of equipment (e.g., to provide a more accurate assessment for one or more equipment options).

As an example, a simulation may be performed using one type of equipment at a position (e.g., with respect to a flowline) and another simulation may be performed using another type of equipment at a different position (e.g., with respect to the same flowline or a different flowline), for example, to determine which type of equipment may be selected for installation in a production system as well as to determine where a type of equipment may be installed. As an example, a simulation may be performed using one type of equipment at a position (e.g., with respect to a flowline) and another simulation may be performed using that type of equipment at a different position (e.g., with respect to the same flowline or a different flowline), for example, to determine where that type of equipment may be installed.

As an example, a piece of equipment at a location in a network may be simulated in a portion of the network using an implicit T and explicit H formulation while the same piece of equipment at a different location in the network may be simulated in a portion of the network using an implicit H and explicit T formulation; noting that other formulations may be used (see, e.g., FIG. 4). In such a manner, a simulation process may allow for selection of a formulation (e.g., manual or automatic) that suits a location of a piece of equipment (e.g., to provide a more accurate assessment for one or more equipment location options).

Figure 5:
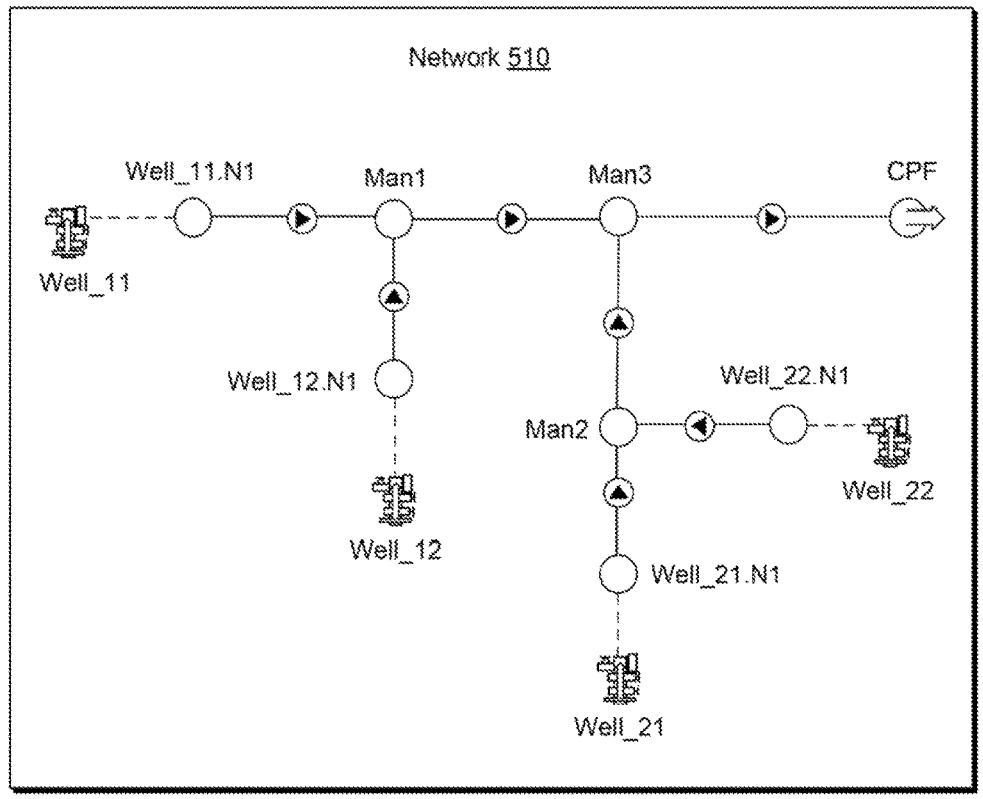
FIG. 5 illustrates an example of a network, which may be a sub-network of a more comprehensive network.

FIG. 5 shows an example of a relatively small production system network 510. As shown, the network 510 forms somewhat of a tree like structure where flowlines represent branches (e.g., segments) and junctions represent nodes. As shown in FIG. 5, the network 510 provides for transportation of oil and gas fluids from well locations along flowlines interconnected at junctions with final delivery at a central processing facility (CPF).

Given information of operating condition(s) at boundary nodes (e.g., where fluid enters and exists the system) and the physical environment between them (e.g., geographical location, elevation and ambient temperature), a production engineer may aim to design a production system that, for example, may meet business and regulatory specifications, for example, that may be constrained to operating limits of available equipment (e.g., which may depend on operational conditions, etc.).

Figure 7:
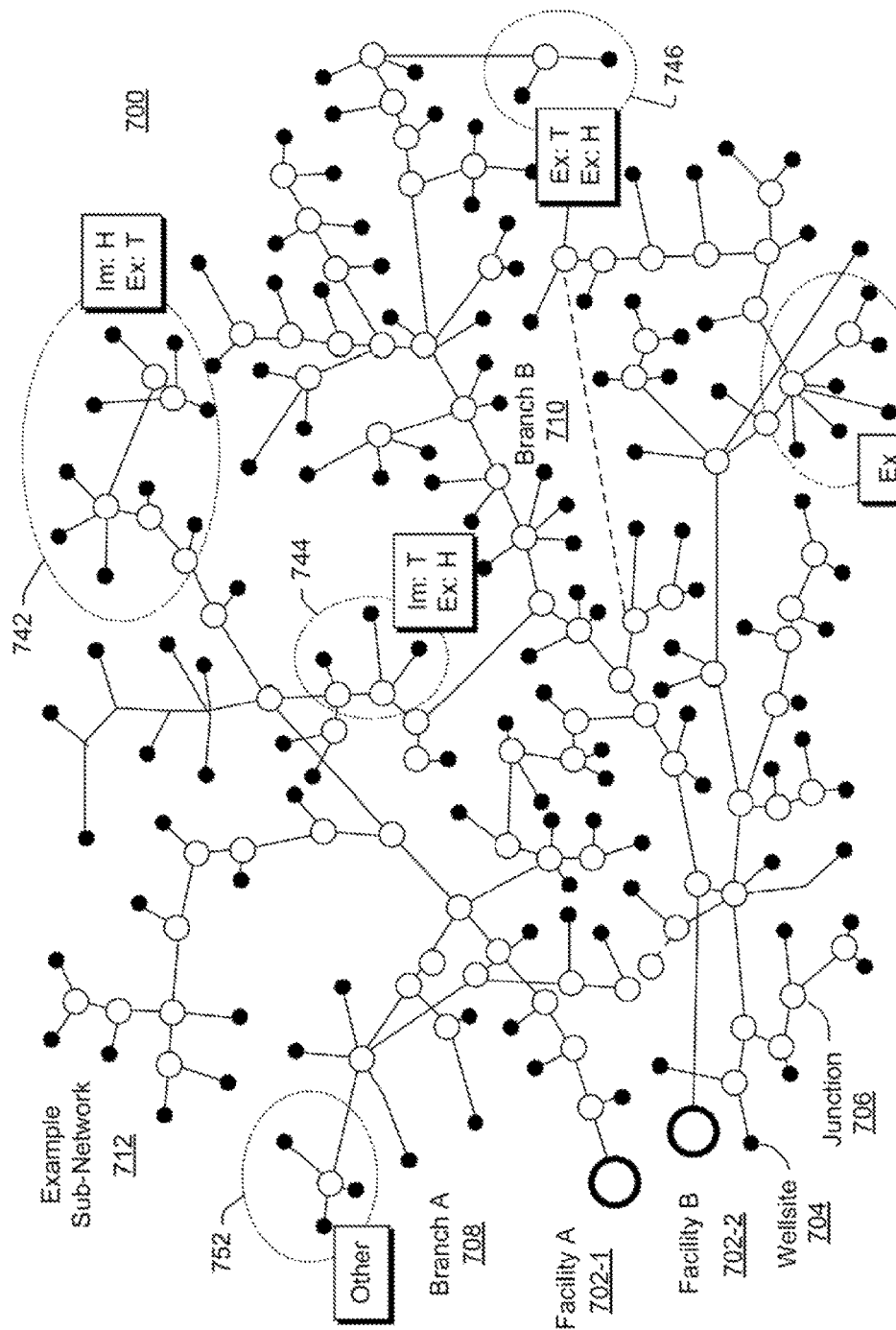
FIG. 7 illustrates an example of a network that includes various sub-networks.

As an example, a method can include implementing one or more of the modules 410 of FIG. 4 to simulate steady state operation of a production system, for example, as including a network (e.g., as a sub-network, etc.) as in the example of FIG. 5, FIG. 1, FIG. 7, etc. Such a method may include simulating the steady state operation over a selected range of operating conditions and configurations (e.g., optionally a broadest reasonable range).

An example is provided below as to equations that may be formulated to model a network and to simulate operation of a production system represented by the network.

Consider a network with $n_N$ nodes and $n_B$ branches as depicted in FIG. 5. Among the $n_N$ nodes, there are $n_{IN}$ internal nodes and $n_{BN}$ boundary nodes. A method can include indexing internal nodes with indices i, i=1, . . . , $n_{IN}$, branches with j, j=1, . . . , $n_B$, and boundary node with k, k=$n_{IN}$+1, . . . , $n_N$. Such a method can include letting $V_I$ denote the set of internal nodes, and $V_B$ denote the set of boundary nodes. For example, a method can include letting V=$V_I \cup V_B$ to denote a set of nodes. Further, such a method can include letting A denote the set of branches. By topology of the network 510, it is also possible to define a set of maps that relate the branches to the nodes. For example, let $\Phi_I$ denote the map from the branch index j to its inlet node index a; let $\Phi_O$ denote the map from the branch index j to its outlet node index b; let $\Phi_S$ denote the map from the branch index j to its geometric start node index s; let $\Phi_E$ denote the map from the branch index j to its geometric end node index e; and let $\Phi_J$ denote the map from a node index b to the set of its connected branches, i.e., $\Phi_J(b)=\{j:\Phi_I(j)=b$ or $\Phi_O(j)=b\}$. Note, as an example, geometric start and end nodes may not necessarily correspond to the inlet and outlet nodes. For example, in a case where they flip, the flow rate $Q_j$ in that branch can be negative.

To model the network 510, a set of equations can include terms for conservation of momentum, conservation of mass and conservation of energy. A set of implicit variables may be formulated, for example, where the following are implicit: pressure P at each node, flow rate Q in each branch and temperature T at each node. In such an example, two intermediate variables may be defined as follows: composition C as a function of Q and enthalpy H as a function of P and T.

As described in various examples herein, equations may be provided (e.g., as part of a simulator, module, etc.) that offer flexibility of treating enthalpy/temperature as implicit variables when appropriate (see, e.g., the modules 410 of FIG. 4). As mentioned, in other approaches, pressure and flow rate may be decoupled from composition and temperature to easily solve a problem, which may work fine when pressure and flow rate are the major factors (e.g., physical phenomena) that drive a solution. However, for situations where changes in enthalpy can lead to dramatic change in fluid properties, such as viscosity and gas/oil ratio (GOR), such changes can result in substantial changes in one or more solutions. An approach that provides flexibility as to treatment of enthalpy/temperature as implicit variables may optionally be applied in situations where, for example, one or more fluids such as heavy oil, water, steam, etc. are present and, for example, where pressure/temperature for one or more fluids are near a critical point (e.g., a vapor-liquid critical point of fluid, above which distinct liquid and gas phases do not exist).

As an example, a method can include calculating fluid composition in a branch on the fly, for example, based on flow rate of adjacent branches. As composition has no direct dependency on pressure or enthalpy, as an example, it may be treated as an explicit function of flow rate.

To provide enthalpy/temperature flexibility, conservation equations are defined, for example, as set forth below such that derivatives (e.g., for a Jacobian matrix) can also be defined. For prior types of formulations that are concerned with pressure and flow rate, there are two derivatives for each branch simulation, one for pressure (e.g., either inlet or outlet) and one for flow rate. As an example, as described below, an implicit enthalpy/temperature formulation can include six derivatives. For example, the six derivatives can include three being derivatives of calculated pressure with respect to given pressure, flow rate and inlet temperature; and three being derivatives of calculated outlet enthalpy with respect to given pressure, flow rate, and inlet temperature.

The size of a linearized system for the fully implicit formulation may be n by n, where $n=2*n_N+n_B$. In addition to residual functions $R_j^P$ and $R_i^Q$ for conservation of momentum and mass, a formulation can include a residual function $R_i^H$ for conservation of energy.

As an example, a complete set of residual equations for branches and internal nodes may be as follows.

$$0 = R_j^P(P_a, P_b, Q_j, T_a) = \begin{cases} f_{CPO}(P_a, Q_j, T_a) - P_b \\ f_{CPI}(P_b, Q_j, T_a) - P_a \end{cases}, \quad [1]$$

$a = \Phi_I(j), b = \Phi_O(j), \text{ for all } j \in A,$ $$0 = R_i^Q(\{Q_j\}_{j\in A}) = \sum_{\substack{j \\ \Phi_E(j)=i}} Q_j - \sum_{\substack{j \\ \Phi_S(j)=i}} Q_j, \text{ for all } i \in V_i, \quad [2]$$

$$0 = R_b^H\left(\{P_a\}_{a\in\Phi_I(\Phi_I(b))}, P_b, \{Q_j\}_{j\in\Phi_j(b)}, \{T_a\}_{a\in\Phi_I(\Phi_j(b))}, T_b\right) \quad [3]$$

$$= \begin{cases} \sum_{\substack{j \\ \Phi_O(j)=b \\ \Phi_I(j)=a}} f_{CHOP}(P_a, Q_j, T_a)|Q_j| - \sum_{\substack{j \\ \Phi_I(j)=b}} H_b(P_b, T_b)|Q_j| \\ \sum_{\substack{j \\ \Phi_O(j)=b \\ \Phi_I(j)=a}} f_{CHIP}(P_b, Q_j, T_a)|Q_j| - \sum_{\substack{j \\ \Phi_I(j)=b}} H_b(P_b, T_b)|Q_j| \end{cases},$$

for all $b \in V_I$, where the functions $f_{CPO}$ and $f_{CPI}$ are evaluated by single-branch simulation, $f_{CPO}$ calculates the outlet pressure given the inlet pressure, temperature, composition and flow rate. i.e., $$f_{CPO}(P_a, Q_j, T_a) = P_{out}(P_a, Q_j, T_a; C_j(Q)). \quad [4]$$

$f_{CPI}$ calculates the inlet pressure given the outlet pressure, inlet temperature, composition and flowrate. i.e., $$f_{CPI}(P_b, Q_j, T_a) = P_{in}(P_b, Q_j, T_a; C_j(Q)). \quad [5]$$

$f_{CHOP}$ and $f_{CHIP}$ are enthalpy calculation by single-branch simulation, in a similar way as $f_{CHO}$ and $f_{CHI}$. $f_{CHOP}$ calculates the outlet enthalpy alongside the outlet pressure given the inlet pressure, temperature, composition and flow rate. i.e., $$f_{CHOP}(P_a, Q_j, T_a) = H_{out}(P_a, Q_j, T_a; C_j(Q)). \quad [6]$$

$f_{CHIP}$ calculates the outlet enthalpy alongside the inlet pressure given the outlet pressure, inlet temperature, composition and flow rate. i.e., $$f_{CHIP}(P_b, Q_j, T_a) = H_{out}(P_b, Q_j, T_a; C_j(Q)). \quad [7]$$

For pipes and completions, $f_{CPO}$, $f_{CPI}$, $f_{CHOP}$, and $f_{CHIP}$ may be, as an example, relatively complex. For example, they may be evaluated through a series of empirical correlations where numerical derivatives may be available (e.g., noting that analytical derivatives may not be available for some types of equations). For some types of equipment, there may be explicit formula that may provide for analytical derivatives. As an example, enthalpy evaluations may be implemented through a flash package or packages and analytical derivatives may not be available. As an example, a feature of the energy conservation equation is that it may implicitly handle mixing of fluid at junction nodes in a network model.

Note, that given conservation of energy equations, as an example, it may be possible to assume that outflow enthalpy at an internal node is the same for each of its downstream branches. However, this assumption may not hold, for example, for equipment such as network separators, where inlet enthalpy may be different for each downstream branches, but possibly with the same inlet temperature.

At each boundary node $N_k$, a method may include defining a PQ boundary condition residual $R_k^{BPQ}$, and an enthalpy boundary condition $R_k^{BH}$.

$$0 = R_k^{BPQ}(P_k, Q_j) = \begin{cases} P_k - P_k^0 \\ Q_j - Q_j^0 \\ P_k - f_{CRV}(Q_j) \end{cases}, \quad [8]$$

$j = S(k), \text{ for all } k \in V_B,$ $$0 = R_k^{BH}(P_a, P_b, Q_j, T_a, T_k) \quad [9]$$

$$= \begin{cases} T_k - T_k^0, & k = \Phi_I(j) \\ T_k - f_{CTOP}(P_a, Q_j, T_a), & k = \Phi_O(j), \\ T_k - f_{CTIP}(P_b, Q_j, T_a), & k = \Phi_O(j), \end{cases}$$

$j = S(k), a = \Phi_I(j), b = \Phi_O(j), \text{ for all } k \in V_B.$ $f_{CTOP}$ calculates the outlet temperature alongside the outlet pressure given the inlet pressure, inlet temperature, composition and flow rate, i.e., $$f_{CTOP}(P_a, Q_j, T_a) = T_{out}(f_{CHOP}(P_a, Q_j, T_a), f_{CPO}(P_a, Q_j, T_a)), a = \Phi_I(j), b = \Phi_o(j). \quad [10]$$

$f_{CTIP}$ calculates the outlet temperature alongside the inlet pressure given the outlet pressure, inlet temperature, composition and flow rate. i.e., $$f_{CTIP}(P_b, Q_j, T_a) = T_{out}(f_{CHIP}(P_b, Q_j, T_a), f_{CPI}(P_b, Q_j, T_a)), a = \Phi_I(j), b = \Phi_o(j). \quad [11]$$

Equations [1-3] and [8-9] constitute $n=2*n_N+n_B$ non-linear equations, which may be solved, for example, via one or more non-linear equation solving techniques, e.g., the Newton-Raphson technique, the Broyden technique, etc. (see, e.g., the network solver 344 of the example of FIG. 3).

Below, a description of an example is given with respect to the Newton-Raphson technique where equations may be rewritten in the following form:

Conservation of Momentum [12]

$$\begin{cases} 0 = R_1^P(P_1, \ldots, P_{n_N}, Q_1, \ldots, Q_{n_B}, T_1, \ldots, T_{n_B}), \\ \vdots \\ 0 = P_{n_B}^P(P_1, \ldots, P_{n_N}, Q_1, \ldots, Q_{n_B}, T_1, \ldots, T_{n_B}), \end{cases}$$

Conservation of Mass $$\begin{cases} 0 = R_1^Q(P_1, \ldots, P_{n_N}, Q_1, \ldots, Q_{n_B}, T_1, \ldots, T_{n_B}), \\ \vdots \\ 0 = R_{n_{IN}}^Q(P_1, \ldots, P_{n_N}, Q_1, \ldots, Q_{n_B}, T_1, \ldots, T_{n_B}), \end{cases}$$

PQ Boundary Conditions $$\begin{cases} 0 = R_1^{BPQ}(P_1, \ldots, P_{n_N}, Q_1, \ldots, Q_{n_B}, T_1, \ldots, T_{n_B}), \\ \vdots \\ 0 = R_{n_{BN}}^{BPQ}(P_1, \ldots, P_{n_N}, Q_1, \ldots, Q_{n_B}, T_1, \ldots, T_{n_B}), \end{cases}$$

Conservation of Energy $$\begin{cases} 0 = R_1^H(P_1, \ldots, P_{n_N}, Q_1, \ldots, Q_{n_B}, T_1, \ldots, T_{n_B}), \\ \vdots \\ 0 = R_{n_{IN}}^H(P_1, \ldots, P_{n_N}, Q_1, \ldots, Q_{n_B}, T_1, \ldots, T_{n_B}), \end{cases}$$

Temperature/Enthalpy B.C.s $$\begin{cases} 0 = R_1^{BH}(P_1, \ldots, P_{n_N}, Q_1, \ldots, Q_{n_B}, T_1, \ldots, T_{n_B}). \\ \vdots \\ 0 = R_{n_{BN}}^{BH}(P_1, \ldots, P_{n_N}, Q_1, \ldots, Q_{n_B}, T_1, \ldots, T_{n_B}), \end{cases}$$

As to the Jacobian matrix (e.g., or simply "Jacobian"), at each Newton iteration of the Newton-Raphson technique, equation (12) may be linearized at a given point $(P_1, \ldots, P_{n_N}, Q_1, \ldots, Q_{n_B}, T_1, \ldots, T_{n_B})$ by a first order approximation, i.e.

$$R(x_0 + \Delta x) \approx R(x_0) + \frac{\partial R}{\partial x}(x_0)\Delta x = 0. \quad [13]$$

Above the Jacobian matrix is denoted as $j=\partial R/\partial x$. An example of a derivation of the entries of J regarding the enthalpy residuals follows, $$\frac{\partial R_b^H}{\partial P_a}(P_a, P_b, Q_j, T_a, T_b) = \begin{cases} \sum_{\substack{j \\ \Phi_O(j)=b}} \frac{\partial f_{CHOP}}{\partial P_a}(P_a, Q_j, T_a)|Q_j| \\ 0, \text{ for } f_{CHIP} \end{cases}, \quad [14]$$

$a = \Phi_I(j)$, for all $b \in V_I$, $$\frac{\partial R_b^H}{\partial P_b}(P_a, P_b, Q_j, T_a, T_b) = \quad [15]$$

$$\begin{cases} -\sum_{\substack{j \\ \Phi_I(j)=b}} \frac{\partial H_b}{\partial P_b}(P_b, T_b)|Q_j|, \text{ for } f_{CHOP} \\ \sum_{\substack{j \\ \Phi_O(j)=b}} \frac{\partial f_{CHIP}}{\partial P_b}(P_b, Q_j, T_a)|Q_j| - \sum_{\substack{j \\ \Phi_I(j)=b}} \frac{\partial H_b}{\partial P_b}(P_b, T_b)|Q_j| \end{cases},$$

$a = \Phi_1(j)$, for all $b \in V_I$, $$\frac{\partial R_b^H}{\partial Q_j}(P_a, P_b, Q_j, T_a, T_b) = \quad [16]$$

$$\begin{cases} \frac{\partial f_{CHOP}}{\partial Q_j}(P_a, Q_j, T_a)|Q_j| + f_{CHOP}(P_a, Q_j, T_a)\text{sign}(Q_j), & \Phi_0(j)=b \\ \frac{\partial f_{CHIP}}{\partial Q_j}(P_b, Q_j, T_a)|Q_j| + f_{CHIP}(P_b, Q_j, T_a)\text{sign}(Q_j), & \Phi_0(j)=b \\ -H_b(P_b, T_b)\text{sign}(Q_j), & \Phi_1(j)=b \end{cases},$$

$a = \Phi_1(j)$, for all $b \in V_I$, $$\frac{\partial R_b^H}{\partial T_a}(P_a, P_b, Q_j, T_a, T_b) = \begin{cases} \sum_{\substack{j \\ \Phi_O(j)=b}} \frac{\partial f_{CHOP}}{\partial T_a}(P_a, Q_j, T_a)|Q_j| \\ \sum_{\substack{j \\ \Phi_O(j)=b}} \frac{\partial f_{CHIP}}{\partial T_a}(P_b, Q_j, T_a)|Q_j| \end{cases}, \quad [17]$$

$a = \Phi_I(j)$, for all $b \in V_I$, $$\frac{\partial R_b^H}{\partial T_b}(P_a, P_b, Q_j, T_a, T_b) = -\sum_{\substack{j \\ \Phi_I(j)=b}} \frac{\partial H_b}{\partial T_b}(P_b, T_b)|Q_j|, \quad [18]$$

$a = \Phi_I(j)$, for all $b \in V_I$,

As a temperature boundary condition (BC) may be used instead of an enthalpy BC, formulation of the residuals in terms of temperature may be provided (a formulation can include equations for one or more temperature BCs, one or more enthalpy BCs, etc.).

$$\frac{\partial R_k^{BH}}{\partial P_a}(P_a, Q_j, T_a, T_k) = \begin{cases} 0, & k = \Phi_I(j) \\ -\frac{\partial f_{CTOP}}{\partial P_a}(P_a, Q_j, T_a), & k = \Phi_O(j) \end{cases}, \quad [19]$$

$j = S(k)$, $a = \Phi_I(j)$, for all $k \in V_B$, $$\partial R_k^{BH}(P_a, Q_j, T_a, T_k) = \begin{cases} 0, & k = \Phi_I(j) \\ -\frac{\partial f_{CTOP}}{\partial Q_j}(P_a, Q_j, T_a), & k = \Phi_O(j) \end{cases}, \quad [20]$$

$j = S(k)$, $a = \Phi_I(j)$, for all $k \in V_B$, $$\frac{\partial R_k^{BH}}{\partial T_a}(P_a, P_b, Q_j, T_a, T_k) = \begin{cases} 0, & k = \Phi_I(j) \\ -\frac{\partial f_{CTOP}}{\partial T_a}(P_a, Q_j, T_a), & k = \Phi_O \\ -\frac{\partial f_{CTIP}}{\partial T_a}(P_b, Q_j, T_a), & k = \Phi_O(j) \end{cases}, \quad [21]$$

$j = S(k)$, $a = \Phi_I(j)$, $b = \Phi_O(j)$, for all $k \in V_B$, $$\frac{\partial R_k^{BH}}{\partial T_k}(P_a, P_b, Q_j, T_a, T_k) = 1, \quad [22]$$

$j = S(k)$, $a = \Phi_I(j)$, for all $k \in V_B$.

As temperature is provided as an implicit variable, the formulation also includes a derivative for a momentum residual $R^P$ with respect to inlet temperature:

$$\frac{\partial R_j^P}{\partial T_a}(P_a, P_b, Q_j, T_a) = \begin{cases} \frac{\partial f_{CPO}}{\partial T_a}(P_a, Q_j, T_a) \\ \frac{\partial f_{CPI}}{\partial T_a}(P_b, Q_j, T_a) \end{cases}, \quad [23]$$

$a = \Phi_I(j)$, $b = \Phi_O(j)$, for all $j \in A$,

In this example, it may be possible to assume that the derivatives for mass residual $R^Q$ with respect to temperature are zero (e.g., where $R^Q$ is not a function of temperature).

As to enthalpy derivatives, first consider an approach concerned with pressure and flow rate where there are two derivatives for each equipment simulation, one for pressure (either inlet or outlet) and one for flow rate. As an example, with an implicit enthalpy formulation, six derivatives may exist, which can be the derivatives of calculated pressure with respect to given pressure, flow rate and inlet temperature, and the derivatives of calculated outlet enthalpy with respect to given pressure, flow rate, and inlet temperature. As an example, the number of derivatives can increase if the formulation includes implicit compositional variables (e.g., as an option).

As an example, equipment may be modeled as being adiabatic (e.g., adiabatic devices), for example, on the basis that equipment lengths are substantially smaller than pipe lengths and that heat loss over such equipment can be suitably considered as being negligible. However, for compressors and pumps, a formulation can optionally consider heat gain as a result of loss of efficiency (e.g., based on manufacturer specifications for efficiency with respect to operational conditions, etc.).

As an example, for instances without an explicit formula for change of enthalpy with respect for pressure and temperature, it may be possible to implement one or more flash algorithms provided as a package or packages, for example, to calculate numerical derivatives. As an example, a formulation and solution process may include implementing one or more flash packages that include features to calculate one or more analytical derivatives.

For $f_{CPO}$ and $f_{CPI}$ calculations, the effects of inlet temperature change can be captured by the change of fluid properties predicted by one or more flash packages. In such an example, temperature derivatives may be set forth for numerical calculation as follows:

$$\frac{\partial f_{CPO}}{\partial T_a}(P_a, Q_j, T_a) \approx \frac{f_{CPO}(P_a, Q_j, T_a + \Delta T) - f_{CPO}(P_a, Q_j, T_a)}{\Delta T}, \quad [24]$$
$$a = \Phi_I(j),$$
$$\frac{\partial f_{CPI}}{\partial T_a}(P_b, Q_j, T_a) \approx \frac{f_{CPI}(P_b, Q_j, T_a + \Delta T) - f_{CPO}(P_b, Q_j, T_a)}{\Delta T},$$
$$a = \Phi_I(j), b = \Phi_O(j)$$

For outlet enthalpy calculations, because of an adiabatic assumption, the following condition may hold $H_{out} = H_{in}$. Therefore, in such an example, equations may be set forth as follows:

$$\frac{\partial H_{out}}{\partial P_a}(P_a, Q_j, T_a) = \frac{\partial H_a}{\partial P_a}(P_a, T_a) \quad [25]$$
$$\approx \frac{H(P_a + \Delta P, T_a) - H(P_a, T_a)}{\Delta P},$$
$$a = \Phi_I(j),$$

$$\frac{\partial H_{out}}{\partial Q_j}(P_a, Q_j, T_a) = \frac{\partial H_a}{\partial Q_j}(P_a, T_a) \quad [26]$$
$$= 0,$$
$$a = \Phi_I(j),$$

-continued
$$\frac{\partial H_{out}}{\partial T_a}(P_a, Q_j, T_a) = \frac{\partial H_a}{\partial T_a}(P_a, T_a) \quad [27]$$
$$\approx \frac{H(P_a, T_a + \Delta T) - H(P_a, T_a)}{\Delta T},$$
$$a = \Phi_I(j),$$

For CPO, both $P_{out}$ and $T_{out}$ may be considered as functions of $P_{in}$ and $T_{in}$. Application of the chain rule yields:

$$\frac{\partial H_{out}}{\partial P_{in}}(P_{out}, T_{out}) = \frac{\partial H_{out}}{\partial P_{out}}\frac{\partial P_{out}}{\partial P_{in}} + \frac{\partial H_{out}}{\partial T_{out}}\frac{\partial T_{out}}{\partial P_{in}}. \quad [28]$$

Hence, the following equations may be provided:

$$\frac{\partial f_{CTOP}}{\partial P_a}(P_a, Q_j, T_a) = \frac{\partial T_{out}}{\partial P_{in}}(P_a, T_a) \quad [29]$$
$$= \left(\frac{\partial H_{out}}{\partial P_{in}} - \frac{\partial H_{out}}{\partial P_{out}}\frac{\partial P_{out}}{\partial P_n}\right) / \frac{\partial H_{out}}{\partial T_{out}}$$
$$= \left(\frac{\partial f_{CHOP}}{\partial P_a}(P_a, Q_j, T_a) - \frac{\partial H_{out}}{\partial P_{out}}\frac{\partial f_{CPO}}{\partial P_a}(P_a, Q_j, T_a)\right) / \frac{\partial H_{out}}{\partial T_{out}},$$
$$a = \Phi_I(j).$$

For CPI, analogously from the chain rule: [30]
$$\frac{\partial f_{CTIP}}{\partial P_b}(P_b, Q_j, T_a) = \left(\frac{\partial f_{CHIP}}{\partial P_b}(P_b, Q_j, T_a) - \frac{\partial H_{out}}{\partial P_{out}}\right) / \frac{\partial H_{out}}{\partial T_{out}},$$
$$a = \Phi_I(j), b = \Phi_O(j).$$

Figure 6:
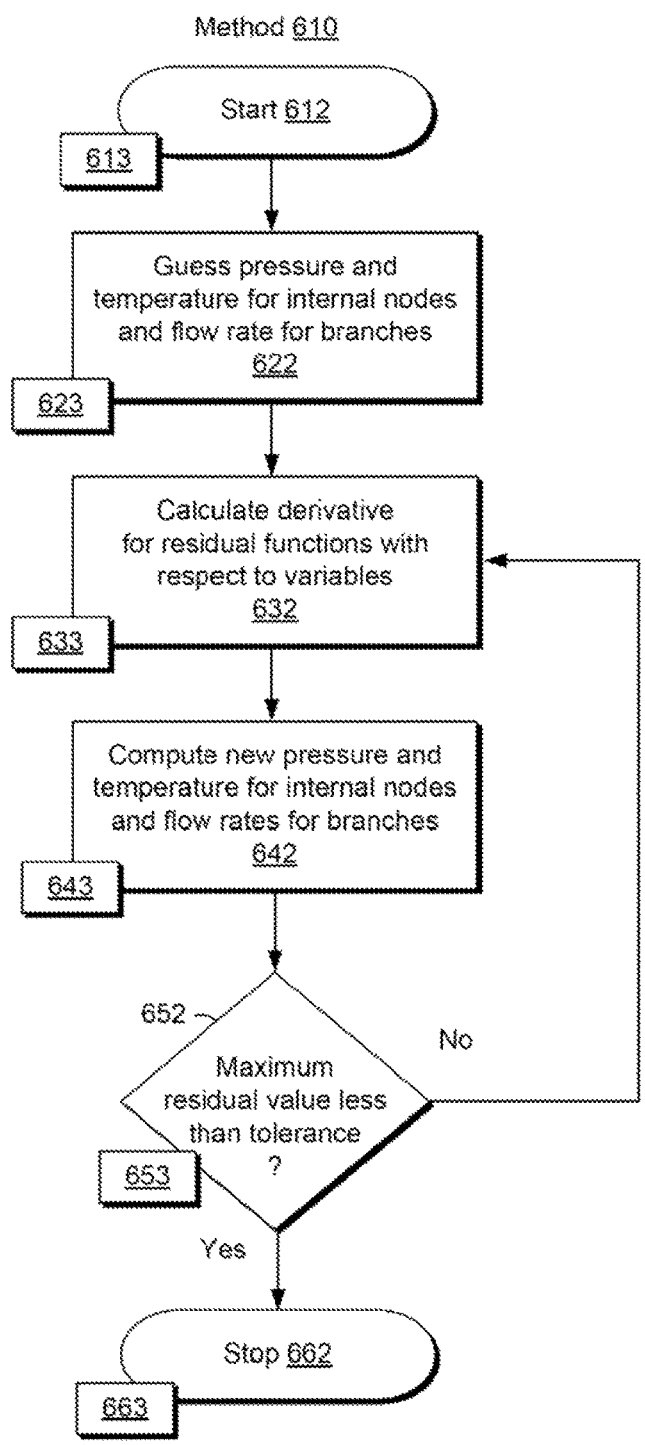
FIG. 6 illustrates an example of a method.

FIG. 6 shows an example of a method 610. The method 610 may be implemented, for example, for network simulation including implicit enthalpy. For example, the method 610 may include calculations of residual functions (e.g., as given in Equations [1-3, 8-9]) and derivatives (e.g., as given in Equations [14-23]). In such an example, new values may be computed using appropriate equation(s) (see, e.g., Equation [13] by solving for Δx).

As shown, the method 610 includes a start block 612, a guess block 622 for guessing pressure and temperature for internal nodes and flow rate for branches (e.g., initial estimates, optionally via execution of an algorithm, etc.), a calculation block 632 for calculating derivatives for residual functions with respect to variables, a computation block 642 for computing new pressure and temperature for internal nodes and flow rates for branches, a decision block 652 for deciding whether a maximum residual value is less than a tolerance (e.g., or making a decision as to one or more other criteria), and a termination block 662 for terminating the method 610 based on a decision of the decision block 652. As indicated, if the decision block 652 decides that one or more criteria have not been met, the method 610 continues at the calculation block 632. As mentioned, a criterion may be a maximum number of iterations.

The method 610 is shown in FIG. 6 in association with various computer-readable media (CRM) blocks 613, 623, 633, 643, 653 and 663. Such blocks generally include instructions suitable for execution by one or more processors (or processing cores) to instruct a computing device or system to perform one or more actions. While various blocks are shown, a single medium may be configured with instructions to allow for, at least in part, performance of various actions of the method 610. As an example, a computer-readable medium (CRM) may be a computer-readable storage medium.

As an example, a method may include adjusting one or more portions of a network based at least in part on an analysis of the network or a portion thereof. Such an analysis may include a convergence analysis, for example, where a solution for a network model does not adequately converge, one or more portions of the network model may be adjusted through use of a different type of formulation of equations. For example, where an analysis indicates that temperature and pressure of a region of a production system represented by a sub-network in a network model place fluid at or near a critical point, the analysis may call for reformulating equations for that sub-network. In such an example, the reformulating may reformulate equations to represent enthalpy implicitly and temperature explicitly or temperature implicitly and enthalpy explicitly. In such an example, boundary conditions may optionally be reformulated. If a simulation for another time (e.g., a steady state where one or more operational parameters, etc., have changed), an analysis may call for reversion to a prior type of formulation of equations for a sub-network or a change to yet another type formulation of equations for that sub-network. As an example, an alteration in a node, branch, etc., of a sub-network may trigger an analysis and optionally result in an adjustment to a formulation of equations for that sub-network.

FIG. 7 shows an example of an oilfield network 700 that includes two processing facilities 702-1 and 702-2 that can collect hydrocarbons from wellsites (see, e.g., a wellsite 704). In the example of FIG. 7, a wellsite may be denoted by a solid black circle, a junction (see, e.g., a junction 706) by a white circle with a black border, and a branch or a pipe (see, e.g., a branch 708) by a line. A dashed line can indicate that a branch (e.g., a branch 710, Branch B) does not permit flow of hydrocarbons or injection of substances. For example, a branch may represent a pipe that is used when desired. When generating a production model, as an example, branches that, for a scenario, do not permit flow of hydrocarbons or injection substances may be omitted from a model (e.g., in terms of formulation of equations, solution, etc.).

In the example of FIG. 7, a sub-network 712 is shown as including various nodes and branches. Further, other sub-networks 742, 744, 746, 748 and 752 are shown. As an example, the sub-network 742 may be formulated using an implicit enthalpy/temperature approach (e.g., according to the example equations above). As an example, an AIM scheme may be implemented whereby one or more sub-networks are adapted from based on one or more factors, which may change with respect to time.

As an example, an AIM scheme may adapt, for example, based on one or more gradients as to one or more variables, properties, etc. of a model. For example, where a network model of a production system includes a sub-network where a property varies rapidly with respect to time, input to a junction, etc., a solution for one or more variables in that sub-network may be modeled using an implicit scheme while an overall solution for the model also implements an explicit scheme (e.g., for one or more other sub-networks). In such an example, a formulation can include equations for an implicit scheme and equations for an explicit scheme.

As an example, during production in a production system, aspects of the type of fluid being produced may change with respect to time. For example, one or more of composition, temperature and pressure may change with respect to time.

As an example, consider changes in conditions that place fluid in a region of the production system at or near a critical point (e.g., a vapor-liquid critical point of a material, above which distinct liquid and gas phases do not exist). A network model of that production system may include a sub-network for that region where upon solving the network model (e.g., for a steady state solution representative of predicted behavior of the production system), an adaption algorithm identifies that sub-network as being better solved using a formulation that includes equations for a scheme with implicit enthalpy/temperature. Where simulation is desired for additional times, it may be possible that the conditions may change for that sub-network and, correspondingly, it may be reverted by an adaption algorithm to another type of formulation.

Referring again to the example of FIG. 7, the sub-network 742 may be associated with a formulation of equations implicit in enthalpy and explicit in temperature, the sub-network 744 may be associated with a formulation of equations implicit in temperature and explicit in enthalpy, the sub-network 746 may be associated with a formulation of equations explicit in temperature and enthalpy, the sub-network 748 may be associated with a formulation of equations explicit in various variables and without implicit variables, and the sub-network 752 may be associated with one or more other types of formulation of equations. As an example, one or more modules (see, e.g., the modules 410 of FIG. 4) may be implemented by a computing device or computing system to determine a type of formulation of equations for a sub-network, which, as mentioned, may change depending on one or more factors.

As an example, where an adaptive approach is implemented, adaptations as to formulations in the network may be noted and stored, rendered, etc. For example, consider changing a boundary condition at an end of a branch in a network where the change results in an adaptation from an explicit to an implicit formulation for a variable for a portion of that branch. Such a change may result in adaptation extending along a branch as the change may impact convergence, etc. (e.g., for one or more upstream variables). For example, where adaptation is triggered by gradient, convergence rate, etc., a change in a boundary condition may ripple upstream in a model of a production system. As an example, a system may provide for viewing a network in conjunction with formulations used for the network. In such an example, the system may indicate that a change in the network (e.g., equipment, boundary condition, etc.) resulted in formulations being adapted to account for that change (e.g., from implicit to explicit for a variable, from explicit to implicit for a variable, etc.).

As an example, a method can include providing a threshold for a portion of a network (e.g., a branch, number of connected branches, etc.) where the threshold is used in an algorithm to control formulation of equations for that portion of the network. For example, consider a threshold of X % where if X % of a portion of the network is formulated as being implicit in a variable, the entire portion of that network is to be formulated as being implicit for that variable. While a threshold is mentioned, one or more other criteria may be provided and used in making decisions as to whether or to what extent a portion of a network should be adapted. As an example, a system may be configured to issue a notice (e.g., an alarm) when a threshold has been reached. As an example, a method can include adapting from an implicit to an explicit formulation of a variable, optionally without reference to a threshold. In other words, a threshold may operate in a directional manner (e.g., invoked if moving from a lower percentage to a higher percentage as to implicit formulation for a portion of a network and not invoked if moving from a higher percentage to a lower percentage as to implicit formulation for a portion of a network).

Figure 8:
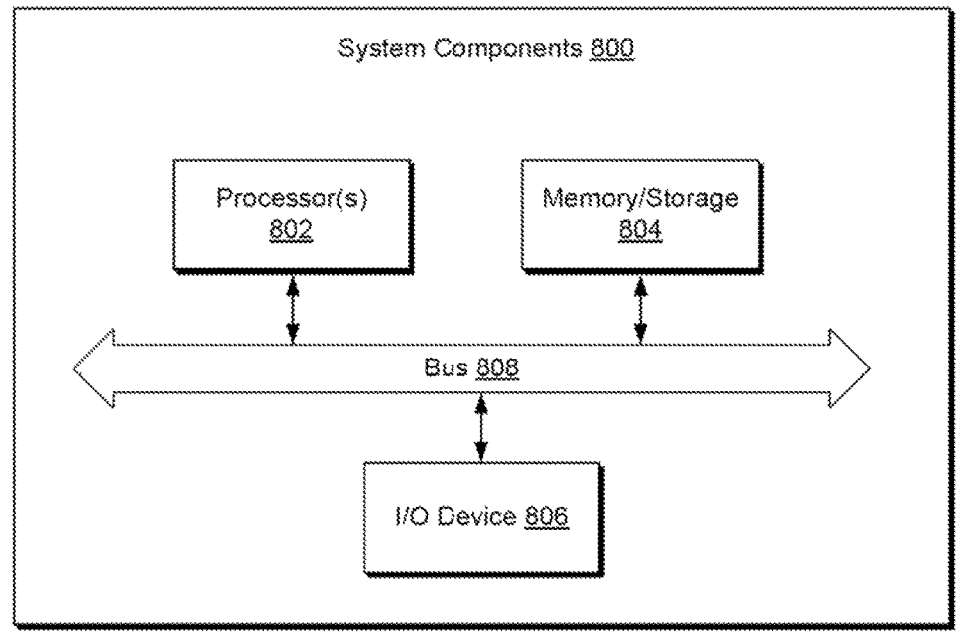
FIG. 8 illustrates example components of a system and a networked system.
Figure 8:
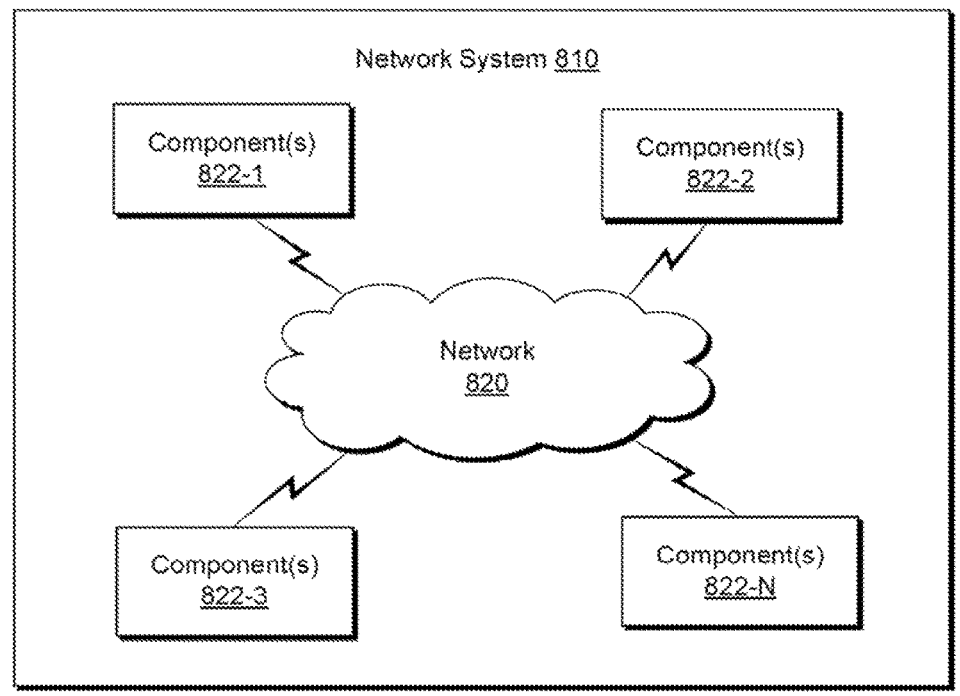

FIG. 8 shows components of an example of a computing system 800 and an example of a networked system 810. The system 800 includes one or more processors 802, memory and/or storage components 804, one or more input and/or output devices 806 and a bus 808. In an example embodiment, instructions may be stored in one or more computer-readable media (e.g., memory/storage components 804). Such instructions may be read by one or more processors (e.g., the processor(s) 802) via a communication bus (e.g., the bus 808), which may be wired or wireless. The one or more processors may execute such instructions to implement (wholly or in part) one or more attributes (e.g., as part of a method). A user may view output from and interact with a process via an I/O device (e.g., the device 806). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 810. The network system 810 includes components 822-1, 822-2, 822-3, . . . 822-N. For example, the components 822-1 may include the processor(s) 802 while the component(s) 822-3 may include memory accessible by the processor(s) 802. Further, the component(s) 802-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although a few example embodiments have been described in detail above, those skilled in the art will readily appreciate that many modifications are possible in the example embodiments. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for adjusting a production system, the method comprising:
building a network model that represents the production system for fluid wherein the production system comprises equipment;
receiving data;
based at least in part on at least a portion of the data, assigning equations to sub-networks in the network model wherein at least one of the sub-networks represents fluid at or near a critical point and is assigned equations formulated for solving for pressure implicitly, flow rate implicitly and enthalpy implicitly or for solving for pressure implicitly, flow rate implicitly and temperature implicitly;
simulating physical phenomena associated with the production system using the network model to provide simulation results; and
based at least in part on the simulation results, selectively adjusting at least one piece of the equipment wherein the piece of the equipment comprises an electric motor operatively coupled to a mechanism to move fluid.

2. The method of claim 1 wherein a piece of the equipment of the production system is represented in one of the sub-networks of the network model and assigned equations formulated to represent the piece of equipment as non-adiabatic.

3. The method of claim 1 wherein the at least one of the sub-networks assigned equations formulated for solving for enthalpy implicitly or temperature implicitly represents heavy oil.

4. The method of claim 1 wherein the at least one of the sub-networks assigned equations formulated for solving for enthalpy or temperature implicitly represents steam.

5. The method of claim 1 comprising analyzing the simulation results and, based at least in part on the analyzing, assigning at least another one of the sub-networks equations formulated for solving for enthalpy implicitly or temperature implicitly.

6. The method of claim 1 comprising analyzing the simulation results and, based at least in part on the analyzing, reassigning at one of the sub-networks assigned equations formulated for solving for enthalpy implicitly or temperature implicitly with equations formulated for solving for enthalpy explicitly and temperature explicitly.

7. A system for adjusting a production system, the system comprising:
- a processor;
- a memory device having memory accessible by the processor; and
- processor-executable instructions stored in the memory of the memory device, the instructions executable to instruct the system to:
- build a network model that represents the production system for fluid wherein the production system comprises equipment,
- receive data,
- based at least in part on at least a portion of the data, assign equations to sub-networks in the network model wherein at least one of the sub-networks represents fluid at or near a critical point and is assigned equations formulated for solving for pressure implicitly, flow rate implicitly and enthalpy implicitly or temperature implicitly,
- simulate physical phenomena associated with the production system using the network model to provide simulation results, and based at least in part on the simulation results, selectively adjust at least one piece of the equipment wherein the piece of the equipment comprises an electric motor operatively coupled to a mechanism to move fluid.

8. The system of claim 7 comprising processor-executable instructions stored in the memory of the memory device executable to instruct the system to adapt one or more of the sub-networks by assigning equations to the one or more of the sub-networks.

9. The system of claim 8 wherein the processor-executable instructions stored in the memory of the memory device comprise the processor-executable instructions executable to instruct the system to adapt the one or more of the sub-networks based at least in part on the simulation results.

10. The system of claim 7 wherein the at least one of the sub-networks is assigned equations formulated for solving for enthalpy implicitly or temperature implicitly to represent heavy oil.

11. The system of claim 7 wherein the at least one of the sub-networks is assigned equations formulated for solving for enthalpy implicitly or temperature implicitly to represent steam.

12. The system of claim 11 wherein the steam comprises steam associated with equipment for an enhanced oil recovery process.

13. The system of claim 7 wherein a piece of the equipment of the production system is represented in one of the sub-networks of the network model and assigned equations formulated to represent the piece of equipment as non-adiabatic.

14. One or more non-transitory computer-readable media for adjusting a production system, the media comprising computer-executable instructions executable by a computer to instruct the computer to:
- receive simulation results for physical phenomena associated with the production system modeled by a network model wherein the production system comprises equipment;
- analyze the simulation results;
- identify one or more sub-networks in the network model for representation of fluid at or near a critical point and assignment of equations formulated for solving for pressure implicitly, flow rate implicitly and enthalpy implicitly or for solving for pressure implicitly, flow rate implicitly and temperature implicitly;
- assign the equations formulated for solving for pressure implicitly, flow rate implicitly and enthalpy implicitly or for solving for pressure implicitly, flow rate implicitly and temperature implicitly to the one or more identified sub-networks;
- simulate physical phenomena associated with the production system using the assigned equations and the network model to provide simulation results; and
- based at least in part on the simulation results, selectively adjust at least one piece of the equipment wherein the piece of the equipment comprises an electric motor operatively coupled to a mechanism to move fluid.

* * * * *